(12) United States Patent
Pattison et al.

(10) Patent No.: US 8,078,153 B2
(45) Date of Patent: Dec. 13, 2011

(54) SYSTEM AND METHOD FOR DYNAMIC PROVISIONING OF CONTEXTUAL-BASED IDENTITIES

(75) Inventors: Ian McLean Pattison, Edinburgh (GB); Roland Zink, Neu-Anspach (DE); Michael Edward Smith Luna, Snohomish, WA (US)

(73) Assignee: 724 Solutions Software, Inc., Santa Barbara, CA (US)

( * ) Notice: Subject to any disclaimer, the term of this patent is extended or adjusted under 35 U.S.C. 154(b) by 0 days.

(21) Appl. No.: 11/796,572

(22) Filed: Apr. 27, 2007

(65) Prior Publication Data
US 2008/0182548 A1 Jul. 31, 2008

Related U.S. Application Data

(60) Provisional application No. 60/746,036, filed on Apr. 29, 2006.

(51) Int. Cl.
*H04L 29/08* (2006.01)
(52) U.S. Cl. ........... 455/414.4; 455/466; 455/414.1; 455/417
(58) Field of Classification Search ............ 455/466, 455/417, 414.4, 450, 414.1
See application file for complete search history.

(56) References Cited

U.S. PATENT DOCUMENTS

| | | |
|---|---|---|
| 3,798,817 A | 3/1974 | Zanoni |
| 4,941,170 A | 7/1990 | Herbst |
| 5,826,017 A | 10/1998 | Holzmann |
| 5,991,812 A | 11/1999 | Srinivasan |
| 6,085,236 A | 7/2000 | Lea |
| 6,173,327 B1 | 1/2001 | De Borst et al. |
| 6,199,099 B1 | 3/2001 | Gershman et al. |
| 6,336,135 B1 | 1/2002 | Niblett et al. |
| 6,343,313 B1 | 1/2002 | Salesky et al. |
| 6,640,248 B1 | 10/2003 | Jorgensen |
| 6,757,365 B1 | 6/2004 | Bogard |
| 6,785,730 B1 | 8/2004 | Taylor |
| 6,792,431 B2 | 9/2004 | Tamboli et al. |
| 6,823,373 B1 | 11/2004 | Pancha et al. |
| 6,912,389 B2 | 6/2005 | Bright et al. |
| 6,957,077 B2 | 10/2005 | Dehlin |
| 7,165,035 B2 | 1/2007 | Zinser et al. |
| 7,181,538 B2 | 2/2007 | Tam et al. |

(Continued)

FOREIGN PATENT DOCUMENTS

WO   WO 2007/127422 A2   11/2007

(Continued)

OTHER PUBLICATIONS

International Search Report and Written Opinion for PCT/US07/010325, mailed Jun. 10, 2008, 11 pgs.

(Continued)

*Primary Examiner* — Kamran Afshar
*Assistant Examiner* — Dung Lam
(74) *Attorney, Agent, or Firm* — Sprinkle IP Law Group

(57) ABSTRACT

Systems and methods for communicating according to contextual identity are disclosed. Embodiments of the present invention provide identity management which may dynamically select appropriate identities or communication channels for communication between network users. More specifically, embodiments of the present invention may automatically select an appropriate identity from a plurality of identities for a user. Thus, users may be provided seamless access to different networks without having to subscribe to the same networks and without having to alter client devices or applications.

22 Claims, 13 Drawing Sheets

JOE: MSISDN +441234567890
ENTERPRISE SIP:JOE@ACME.COM

FRED: MSISDN +440987654321
ENTERPRISE SIP:FRED@ACME.COM

1. JOE CREATES SMS, PICKS FRED FROM PHONE ADDRESS BOOK.
2. SMS SENT TO +440987654321
3. NETWORK BRIDGE, BASED ON PRESENCE, CREATES IM CHAT SESSION TO FRED@ACME.COM
4. FRED GETS AND ACCEPTS CHAT SESSION INVITATION FROM JOE@ACME.COM
5. FRED RECEIVES TEXT IM FROM JOE.
6. FRED DRAGS A FILE CONTAINING A JPEG PICTURE ONTO THE IM CHAT SESSION WINDOW
7. SENT AS FILE TRANSFER VIA IM CHAT SESSION
8. NETWORK BRIDGE, BASED ON PRESENCE, ELECTS TO DELIVER PICTURE VIA MMS
9. CREATES A MMS TO +44123456789 FROM +440987654321
10. MMS RECEIVED ON JOE'S PHONE
11. JOE'S PHONE MAPS THE ORIGINATOR MSISDN TO PHONE BOOK ENTRY FOR FRED.

U.S. PATENT DOCUMENTS

| | | |
|---|---|---|
| 7,185,049 B1 | 2/2007 | Benitez et al. |
| 7,215,643 B2* | 5/2007 | Mussman et al. ............ 370/237 |
| 7,266,611 B2 | 9/2007 | Jabri et al. |
| 7,295,608 B2 | 11/2007 | Reynolds et al. |
| 7,328,042 B2* | 2/2008 | Choksi ................ 455/552.1 |
| 7,509,431 B2 | 3/2009 | Singhal et al. |
| 7,548,987 B2 | 6/2009 | Jabri et al. |
| 7,650,415 B1 | 1/2010 | Peterson |
| 7,805,532 B2 | 9/2010 | Pattison et al. |
| 2002/0007398 A1 | 1/2002 | Mendiola et al. |
| 2002/0065935 A1 | 5/2002 | Koperda et al. |
| 2002/0122547 A1* | 9/2002 | Hinchey et al. ......... 379/221.01 |
| 2002/0155826 A1 | 10/2002 | Robinson et al. |
| 2002/0186723 A1 | 12/2002 | Sprague et al. |
| 2003/0016639 A1* | 1/2003 | Kransmo et al. ............ 370/335 |
| 2003/0087632 A1 | 5/2003 | Sagi et al. |
| 2003/0224814 A1 | 12/2003 | Qu et al. |
| 2004/0032881 A1 | 2/2004 | Arai |
| 2004/0093202 A1 | 5/2004 | Fischer et al. |
| 2004/0121785 A1* | 6/2004 | Vance et al. .............. 455/466 |
| 2004/0152477 A1 | 8/2004 | Wu et al. |
| 2005/0009541 A1* | 1/2005 | Ye et al. ................ 455/466 |
| 2005/0044144 A1 | 2/2005 | Malik et al. |
| 2005/0108328 A1 | 5/2005 | Berkeland et al. |
| 2005/0114533 A1 | 5/2005 | Hullfish et al. |
| 2005/0143136 A1 | 6/2005 | Lev et al. |
| 2005/0165913 A1 | 7/2005 | Coulombe et al. |
| 2005/0197108 A1 | 9/2005 | Salvatore et al. |
| 2005/0271059 A1 | 12/2005 | Young et al. |
| 2006/0053227 A1 | 3/2006 | Ye et al. |
| 2007/0016390 A1 | 1/2007 | Bernardo et al. |
| 2007/0076857 A1* | 4/2007 | Chava et al. ............ 379/88.17 |
| 2008/0147864 A1 | 6/2008 | Drogo de Iacovo et al. |
| 2008/0263137 A1 | 10/2008 | Pattison et al. |
| 2009/0049202 A1 | 2/2009 | Pattison et al. |

FOREIGN PATENT DOCUMENTS

| | | |
|---|---|---|
| WO | WO 2007/130312 A2 | 11/2007 |
| WO | WO 2009/061677 A1 | 5/2009 |

OTHER PUBLICATIONS

International Search Report and Written Opinion for PCT/US08/82062, mailed Jan. 9, 2009, 8 pgs.

International Preliminary Report on Patentability, PCT/US07/010325, mailed Nov. 13, 2008, 7 pgs.

International Report on Patentability, PCT/US2007/010327, mailed Dec. 31, 2008, 8 pgs.

Office Action issued in U.S. Appl. No. 11/796,707 mailed Jun. 18, 2009, 12 pgs.

Office Action issued in U.S. Appl. No. 11/937,695 mailed Sep. 9, 2009, 15 pgs.

International Search Report and Written Opinion mailed on Nov. 24, 2008 for PCT Application No. PCT/US2007/010327.

International Preliminary Report on Patentability mailed on Dec. 31, 2008 for PCT Application No. PCT/US2007/010327.

Office Action issued in U.S. Appl. No. 11/937,695 mailed Mar. 11, 2010, 19 pg.

International Preliminary Report on Patentability (Chapter I) for PCT/US2008/082062, issued May 11, 2010, 6 pgs.

* cited by examiner

SYSTEM AND METHOD FOR DYNAMIC PROVISIONING OF CONTEXTUAL-BASED IDENTITIES

RELATED APPLICATIONS

This application claims priority to U.S. Provisional Patent Application Ser. No. 60/746,036 by inventors Ian McLean Pattison, Michael Edward Luna, and Roland Zink, entitled "Contextual Based Identity" filed on Apr. 29, 2006, the entire contents of which are hereby expressly incorporated by reference for all purposes.

FIELD OF THE INVENTION

The present invention is generally related to the field of telecommunications, and more particularly, to systems and methods for communicating according to contextual based identity.

BACKGROUND OF THE INVENTION

A number of different types of telecommunication networks and telecommunication protocols currently exist. For example, mobile networks use protocols that allow mobile device users to move from one location to another. Examples of mobile devices include, without limitation, mobile phones, personal digital assistants (PDAs), and laptops, etc.

Fixed networks provide data services in a fixed environment. An example of a fixed network is a DSL (digital subscriber line) network. A fixed network may be fixed wireless or fixed wireline. Fixed wireless is an alternative to fixed wireline, e.g., landline, coaxial cable, and copper connections. Fixed wireless refers to the operation of wireless devices or systems in fixed locations such as homes and offices. An example of fixed wireless is broadband wireless access in a home.

In addition, a number of different types of data services and different methods of communicating between or among devices currently exist. For example, Short Message Service (SMS) is a service for sending text messages to mobile phones and other devices.

As another example, Multimedia Messaging Service (MMS) is a communications technology that allows users to exchange multimedia messages and content between MMS-capable mobile phones and other MMS-capable devices. MMS usually requires users to have the same or compatible clients on both ends.

Wireless Application Protocol (WAP) is a specification for a set of communication protocols to standardize the way that wireless devices, such as cellular telephones and radio transceivers, can be used for Internet access, including e-mail, the World Wide Web, newsgroups, and instant messaging, etc. WAP-based services require special browsers or infrastructure to access services. While Internet access has been possible in the past, different manufacturers have used different technologies.

IP Multimedia Subsystem (IMS) is defined by Third Generation Partnership Project (3GPP) as an architecture for multimedia sessions over IP. IMS and other advanced IP-based services such as Voice over IP (VoIP), which rely on new network topologies and new clients for access, may be considered separate networks as their architecture may fail to consider interoperability, a subscriber's identity, target client, or services beyond basic voice services.

Many other types of data services and methods of communicating exist, such as creating separate networks for IMS or other advanced services which also results in creating isolated services and islands of communities. This situation poses a barrier to interoperability.

Additionally, within these various mobile and fixed networks, there are multiple channels via which users can originate and/or receive messages or other forms of communication. In many cases, a single subscriber may have multiple identities, including different identities for phone-based services, such as voice and SMS or MMS, as well as identities for other communication channels such as instant messaging and e-mail.

SUMMARY OF THE INVENTION

Access to existing infrastructure and existing clients has been limited as specialized nodes are usually used for interworking and special provisioning usually must be made to enable access or inter-communication with existing subscribers. When new access methods and services are introduced, they are generally implemented in mobile and fixed wireless networks as discrete, end-to-end services which rely on specific clients or network technology to enable access. This typically limits the addressable subscriber population to only those with compatible technology. SMS, for example, has SMS clients communicating across SMS servers in the network. MMS servers use similar structure—MMS clients communicate via MMS servers on a network to other MMS clients. However, these may be two distinct networks. Thus, if an MMS message, even a MMS message containing only text content, is sent to an SMS client, the message will not be delivered.

Enabling users of differing technology to communicate typically involves limited or complex methods and is usually accomplished by the introduction of functionality tailored specifically to the types of technologies or protocols which it is desired to bridge. For example, an MMS to email communication is possible, but this is accomplished by instituting some specific piece of functionality into the MMS infrastructure which accomplishes this MMS to email communication (and which might not even accomplish an email to MMS communication).

These difficulties have created problems with up-take and adoption of new technologies (e.g. next generation networks or protocols) by forcing users to update clients and services to maintain connectivity with others in their community. It also increases the time to pay-back investment in the installation or use of such new services and network infrastructures.

As can be seen in the above-described cases, interoperability between existing services and/or existing clients is approached on a service-by-service basis. This approach results in closed environments where the vendor providing a solution for new services or new clients defines the level of interoperability with existing services and/or clients, resulting in inconsistent and proprietary solutions. It also results in additional costs as there is not a consistent platform for providing interoperability between disparate services and or clients.

In addition, a limitation of existing technology is that in most cases, either the originator of a message must use the correct identity of the recipient for the channel via which the message is to be delivered, or there is a fixed mapping for a target address for a given service, which may be supported by, for example, DNS ENUM (Domain Name System Electronic Numbering), to convert a MSISDN (Mobile Subscriber ISDN Number) to a mail address to allow MMS to e-mail routing. As a result of this limitation, there is no capability to take into account a subscriber's current environment in deciding which of a user's identities should be used for expressing the originator's or recipient's identity. This is especially a limitation in environments which attempt to bridge from one communication channel to another.

Since new network technologies often introduce new ways of identifying or routing messages to a subscriber, the problem of identity management across network types arises. The industry is addressing this with the concept of a single identity, but the problem is better solved not with a single identity, but rather, by selecting the right identity for the subscriber based for example, on the network and type of device he or she is using at a given time.

As there are new data transport protocols and entire stacks introduced which manage the authentication, billing, and routing of messages in new networks. It would be desirable for these protocols to be seamlessly bridged between newer (e.g. next generation) networks or existing networks and legacy networks in a way that preserves both access management and billing services, as well as protocol transformation (which can be accomplished today with simple proxies and gateways).

Usually, each new service introduced is associated with a means to bill, provision, or track usages of a service (e.g., to enable business logic associated with the services). When considering inter-network interoperability, it would be desirable to provide a means to extend the business logic to subscribers that may be accessing the service from outside the network of origin.

This desire has driven the need for improved systems and methods for communication that overcome the deficiencies in the prior art. In accordance with one embodiment of the present invention, a platform is provided that leverages existing standards to seamlessly connect next-generation networks to legacy networks without complex subscriber or network-based provisioning. More specifically, a legacy network (e.g. an existing network) and its subscribers appear as a seamless extension to any new networks. An emulated interface as provided by embodiments of the present invention advantageously allows interoperability between new technology and existing technology without any specialized or proprietary support in the new technology domain. By providing an emulated interface between the networks and services, provisioning, management, and integration costs are advantageously reduced. Moreover, adoption of new technology is increased as a result of greater interoperability.

In accordance with one embodiment of the present invention, a method for communicating according to contextual based identity is disclosed. A method for communicating according to contextual identity, the method comprising the acts of: receiving a communication from a user of a first network which communicates according to a first communication protocol, normalizing the communication into a network-independent format, selecting a channel of communication for a recipient user of a second network which communicates according to a second communication protocol, and sending the communication to an identity of the second user via the selected channel of communication, wherein the communication includes an identity of the first user, wherein the first and second user identities are contextual to the channel of communication.

In some embodiments, an identity comprises a routable address, such as an E.164 number, a phone number, or an MSISDN.

In some embodiments, an identity comprises a SIP URI, an IP address, an e-mail address, or an IM identity.

In one embodiment, the channel may be selected based on a recipient preference, on presence information associated with the recipient, on a classification of the sender by the recipient, or on the communication.

In some embodiments the present invention is further capable of selecting a second identity based on dynamic presence information associated with the first or second user.

In some embodiments, the first network comprises an IMS network, and the second network does not comprise an IMS network, such as a macro-cellular network, or an IP-based network.

In some embodiments, the present invention is further capable of routing the normalized communication to an application operable to generate a response to the communication; and receiving a communication from the application server, wherein the communication received from the application server is sent to the identity of the second user.

In accordance with another embodiment of the present invention, a method for service delivery according to contextual identity is provided. A method for service delivery according to contextual identity, the method comprising the acts of receiving a service request from a subscriber of a first network, normalizing the service request into a network-independent format, selecting a channel of communication for a recipient user of a second network, and sending the service request to an identity of the second user via the selected channel of communication, wherein the service request includes an identity of the first user, wherein the identity is contextual to the channel of communication.

In some embodiments, the selected address comprises a routable messaging address, such as an E.164 number, a phone number, an MSISDN, a SIP URI, an IP address, or an e-mail address.

In some embodiments, the act of selecting the channel of communication is based on one or more preferences designated by the recipient, presence information associated with the recipient, a classification of the user by the recipient, or on the request. Embodiments of the present invention may further include selecting a second address based on dynamic presence information associated with the recipient. The service request may be, in some embodiments, a push-to-talk service request, an instant messaging service request, an MMS message, an SMS message. One of the first and second networks may be an IMS network, and other network may be an IP-based network.

In accordance with another embodiment of the present invention, a system for contextual identity management includes a network bridge comprising a plurality of protocol adapters, each configured to adapt data received from any of a plurality of networks. An application bridge is communicably coupled to the network bridge. The application bridge is configured to receive and respond to service requests. The network bridge further comprises a plurality of protocol gateways, each configured to route the adapted data to an appropriate application server in the application bridge. The application bridge may receive information obtained by a presence network agent configured to provide presence information about a user to a presence server, such as an IMS based presence server for users who are not IMS subscribers. The application or network bridge may further comprise an address resolution interface configured to determine a user address. The application bridge may further comprise a user profile interface configured to provide one or more user preferences. A billing bridge may be provided, which is communicably coupled to the network bridge, and is configured to control access to content and services.

Embodiments of the present invention described herein may be implemented by software or hardware or both. For example, a machine-readable medium having stored thereon a plurality of executable instructions for implementing the methods of the present invention may be provided. The executable instructions may be stored as software code components or modules on one or more computer readable media (e.g., non-volatile memories, volatile memories, DASD arrays, magnetic tapes, floppy diskettes, hard drives, optical storage devices, or any other appropriate computer-readable medium or storage device). In one exemplary embodiment of the invention, the executable instructions may include lines of compiled C++, Java, HTML, or any other programming or scripting code.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION OF THE INVENTION

Figure 1:
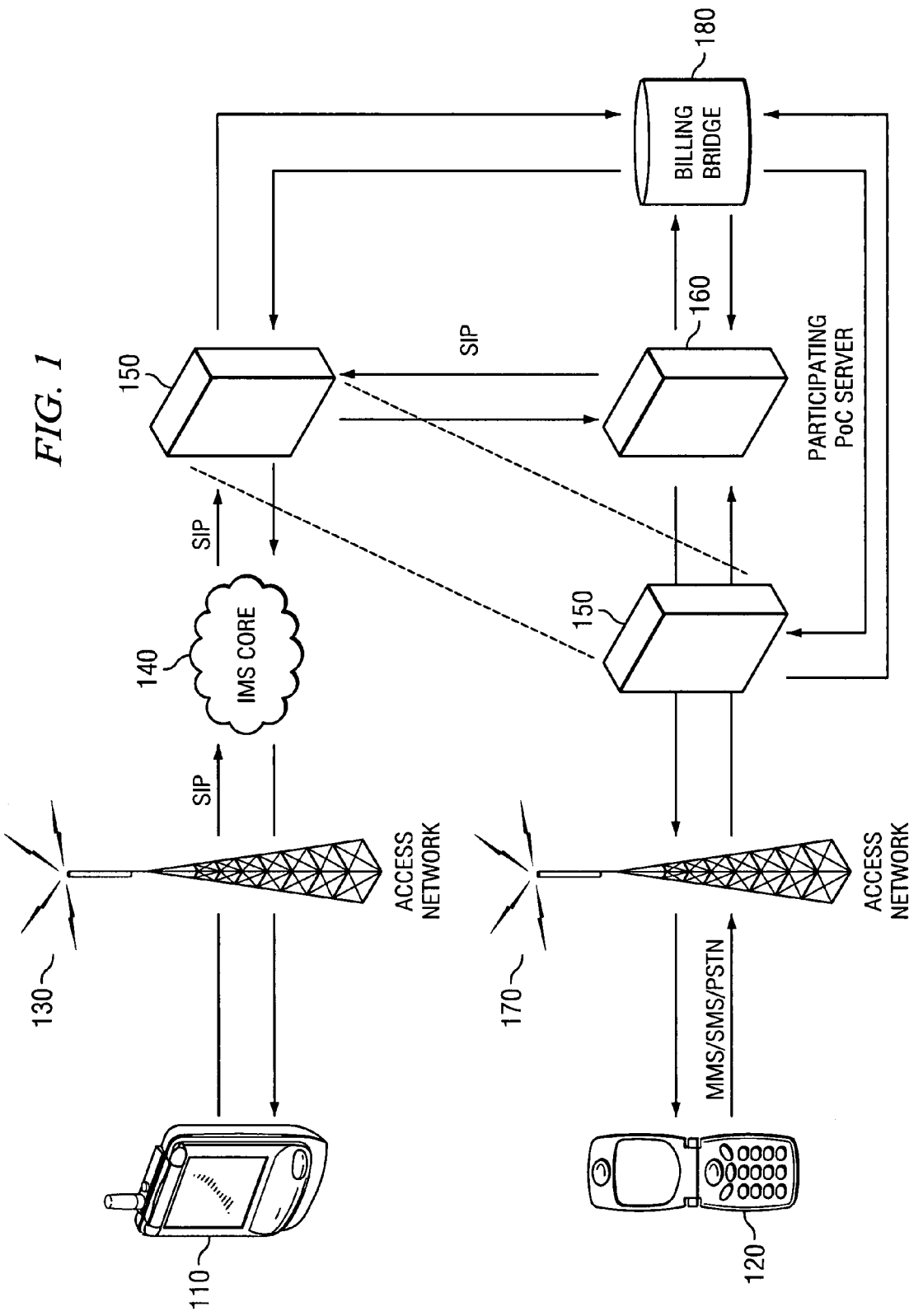
FIG. 1 depicts a block diagram for illustrating an exemplary implementation of one embodiment of the present invention for contextual identity when PoC is bridged to another network.

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements). Embodiments of the present invention may be utilized in conjunction with the platform for interoperability described in U.S. patent application Ser. No. 11/796,707 by inventors Michael Edward Luna, Ian McLean Pattison, Hanni Doch and Roland Zink, entitled "Platform for Interoperability" filed on Apr. 27, 2007, the entire contents of which are hereby expressly incorporated by reference for all purposes.

Attention is now directed to systems and methods for contextual identity mapping. More specifically, embodiments of the present invention are presented herein whereby a user may send a communication to an intended recipient utilizing an identity for the recipient based upon an identity valid in the originating user's context. The communication can then be delivered to the recipient utilizing a selected identity, selected based on a set of criteria for the recipient, which may be a different identity than the initial identity. As the set of criteria associated with a particular recipient may vary over time and based upon the actions of a recipient, identities for the delivery of messages to a recipient may be dynamically selected based upon a recipient's actions, whereabouts or a wide variety of other variables.

Additionally, embodiments of the present invention may select an identity for the sender of the communication which is congruent to the selected identity for the recipient such that when the communication is delivered to the intended recipient it appears as if the communication originated from the identity selected for the sender, and thus may be in the correct context for the recipient.

Embodiments of the present invention may be better explained with a brief example. Suppose a user on mobile phone wishes to send a text message to a recipient and uses an identity of the recipient which corresponds to the recipient's mobile phone (e.g. a phone number for the recipient) to send such a text message. This text message may be received by an embodiment of the present invention and based on the initial identity for the recipient a set of criteria associated with the recipient may be evaluated. Based on this evaluation another identity may be selected for the recipient, where the identity may correspond to a different delivery format, protocol, device or the like. For example in this case an email address may be selected for the recipient. The text message can then be delivered according to the selected identity for the recipient. Here this may entail formulating the original text message as an email and sending this email to the recipient's email address (e.g. the selected identity).

Additionally, embodiments of the present invention may utilize the identity of the sender (or other criteria associated with the sender), in this case the sender's phone number, to select an identity for the sender congruent with the identity selected for the recipient. Thus, in this case the sender's email address may be selected as an identity for the originator of the email. When the email is delivered to the recipients email address, it will appear as if the email originated from the sender's email address.

Suppose now that the recipient of the initial message leaves his desk and places a call on his mobile phone. Here the set of criteria associated with the recipient may dynamically change (e.g. the criteria may be updated to reflect that his computer has gone to sleep, or that a call has been placed from his mobile phone, etc.). Consequently, if another text message is sent to the recipient an identity may be selected for the recipient which corresponds to the recipient's mobile device (e.g. using the updated set of criteria) and the message delivered according to this selected identity. As can be seen then, a communication may be delivered to a variety of identities corresponding to a recipient, where the identity selected may change according to a dynamically updated set of criteria or context associated with a particular recipient. In this way a communication may delivered to a recipient in a manner which may be convenient to the recipient. Similarly, if the recipient replies, the reply as addressed with identities in context for the corresponding user, and the message is delivered in correct context for the intended recipient, which may differ from how the reply is addressed and also how the original message was sent (e.g. the original sender has changed their context.)

Reference is now made to FIG. 1, which depicts a block diagram for illustrating an exemplary embodiment of the present invention that enables for example, the extension of the PoC service from an IMS network to subscribers in a non-IMS network. PoC allows a mobile phone to effectively function as a walkie-talkie. A PoC user may connect via a dedicated button. No dialing phone number is needed. A message is sent and played back via the recipient's speaker. Half-duplex technology is typically provided. PoC is advantageous to end-users by providing quick connect times, cheaper cost (single handset), group talking, simplicity of use, and expanded range (as compared to a walkie-talkie). PoC is advantageous to operators by attracting new users, providing a new voice service, encouraging multiple participants to take up the service, providing efficient use of network resources, and utilizing existing cell towers, with greater distance coverage. However, PoC is traditionally available only to PoC subscribers with PoC-enabled devices.

In the example of FIG. 1, embodiments of the present invention may be utilized to communicate between an IMS device on an IMS network with a non-IMS enabled device on a non-IMS network. Suppose an IMS subscriber (Jane) requests a PoC session with a non-IMS subscriber (Carlos). Jane's cell phone 110 has PoC capability, while Carlos' cell phone 120 does not. Carlos' cell phone 120 is, however, capable of handling SMS messages.

A SIP (Session Initiation Protocol) message is sent from Jane's cell phone 110 via a wireless access network 130, to which Jane subscribes, and an IMS core network 140. The core IMS network includes a Controlling PoC server to which Jane's request is sent. The Controlling PoC server forwards an invitation to Carlos which is routed to an access management server 150 (e.g. a network bridge). The access management server 150 forwards the request to the appropriate legacy support server 160 (e.g. an application bridge). The support server 160 forwards an SMS message to Carlos' cell phone 120 via the access management server 150 and a wireless access network 170 to which Carlos subscribes. The message may be displayed on Carlos' phone 120, for example, as a message instructing Carlos on how to participate in the session. For example, the message may comprise an SMS message which reads as follows: "Jane wants to connect with you via push to talk. To talk dial 123." As another example, if Carlos' cell phone 120 is an MMS-capable device, the message may comprise a MMS message which announces as follows: "Jane wants to connect with you via push to talk," and Carlos may listen and reply with an MMS message with audio content. As yet another example, the message sent to Carlos may be a voice signal formatted according to a PSTN protocol.

Embodiments of the present invention advantageously provides contextual identity mapping to ensure that Carlos not only receives the communication but receives the communication in a format appropriate for Carlos' device, with Jane's identity appearing in a format appropriate for Carlos' device. To Carlos, Jane appears to be communicating using the same protocol as Carlos.

Carlos' response, whether SMS, MMS, or other format, is sent from Carlos' cell phone 120 via Carlos' access network 170, the access management server 150, and the support server 160. The access management server 150 then formats a SIP message and sends it to Jane's cell phone 110 via the access management server 150, the IMS core network 140, and Jane's access network 130. When Jane receives Carlos' response, the present invention advantageously delivers the content in a format appropriate for Jane's device and Carlos' identity appears in a format appropriate for Jane's device. Communication between Jane and Carlos appear as if both devices are utilizing the same protocol and communication (messages, requests, responses, etc.) are exchanged seamlessly.

Thus, it can be seen that the PoC service is effectively deployed as an application in the non-IMS domain, whereas previously, the service could only be used by registered IMS subscribers. From the perspectives of the IMS subscribers and the non-IMS subscribers, it appears as if they are communicating within the same network rather than separate, different networks. The interoperability is transparent to the subscribers as well as the network operators.

In accordance with embodiments of the present embodiment, non-network users (e.g., non-IMS subscribers) appear as if they are network users (e.g., IMS subscribers) in a foreign/remote domain (IMS). In the example depicted in FIG. 1, the IMS network and PoC service allow for interoperability with such foreign/remote IMS subscribers by routing requests to the foreign/remote IMS domain via an I-CSCF. The network bridge (access management server) appears to the IMS domain as an I-CSCF, allowing the new service to use standard interworking capabilities but reach the application bridge providing the PoC interoperability service to the legacy non-IMS subscribers.

In embodiments of the present invention, subscriber identity management is provided. This provides a means to allow mobile and fixed services to interact with users of existing clients in a seamless manner by ensuring the user's identity that is presented is in context to the client and application that the recipient is currently using. It also allows originators to identify recipients using an address in context to the originating client and not the recipient client (which may not be known at the point of origination) that receives the communication.

Figure 2:
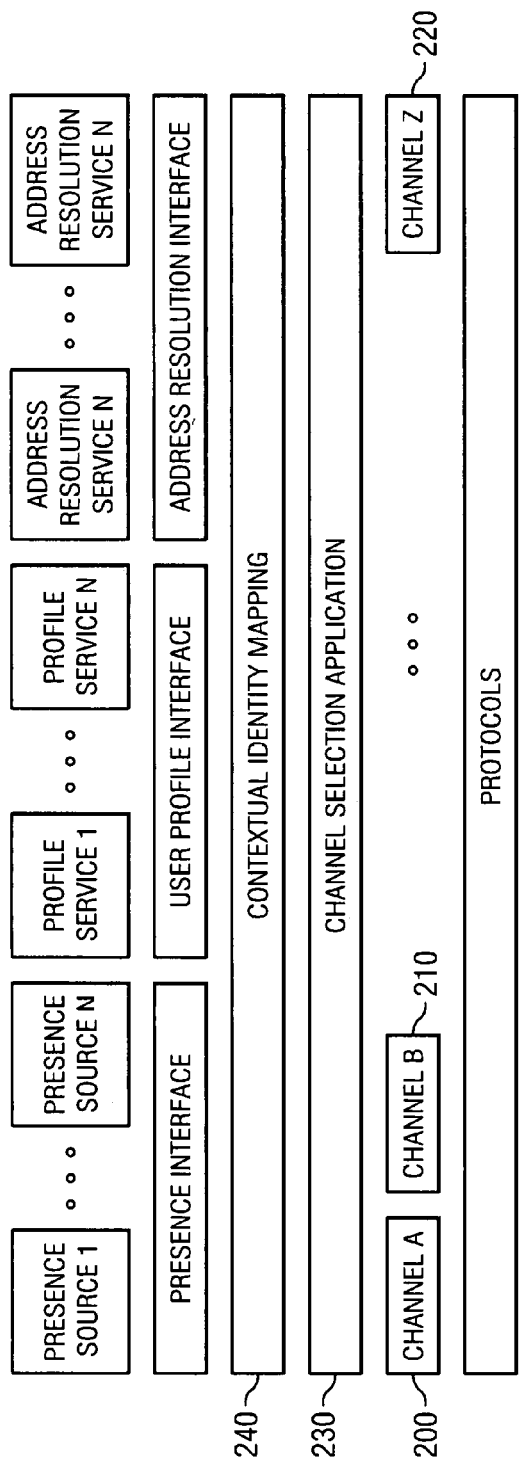
FIG. 2 depicts a block diagram of an exemplary architecture for one embodiment of a network bridge with multiple channels.

Reference is now made to FIG. 2 which depicts a block diagram of an exemplary architecture for an embodiment of a network bridge with multiple channels which can be used for input and output. For example, Channel A 200 may comprise an SMS channel, Channel B 210 may comprise an MMS channel, and Channel Z 220 may comprise an SIP/IMS channel. Additional channels of communication may be provided.

The channel selection and routing application 230 makes use of contextual identity mapping in order to route between channels. Channel selection may be based on a set of criteria including fixed rules, presence information to determine what channels a user is currently accessible on, user preferences, service provider policy, a classification of the sender by the recipient, or an attribute of the request such as priority or content type to match the content type of the request to the content type supported by a channel on which a user may be reached, or any combination of the above or any additional criteria.

The contextual identity mapping layer 240 makes use of services such as presence, user profiles, and address resolution services to ensure that identities are mapped into, or selected according to, a form that is natural to the channel being used for communication.

Presence information, such as in the presence sources, may be managed by any of a number of different ways. Presence information may be explicit. For example, presence may be user-controlled. Users may manage their presence via a web browser or offline web-based tool. Users may manipulate presence information from a phone. For example, a USSD (Unstructured Supplementary Services Data) application may set available or unavailable status. Presence information may also be implicit. For example, an IM user may be idle after a certain period of no activity. Presence information may be determined by other means. For example, a TapRoot or Bluetooth-enabled device may detect when a user has walked away from his or her computer or other client device. Presence information about a cell phone user may be obtained from a Home Location Register (HLR) for the mobile phone network. Presence information about an IM user may be obtained from an IM presence server. Presence information may be dynamic, and tracking changes in presence and changes in target UE (User Equipment) is advantageously provided. As a further example, presence information may be collected by monitoring activity to browser and fetch messages via the WAP (or other) gateway installed in the existing communication network. The act of collecting this information creates a "network presence agent" as part of the access management platform.

User profile information may include user preferences for access control rules, such as from whom users will accept calls, and rules for who can subscribe to the users' presence information. Users may also specify preferences for notification mechanisms, e.g., SMS, MMS, or callout; or callback or MMS with audio content. User profile information may comprise preferences for a hierarchy of devices. For example, a user who has three devices may prefer to have communications delivered to device A first, then to device B, and then to device C. User profile information may also be obtained from outside sources, such as Microsoft Active Directory™ or a HSS user profile.

Address contextual identity mapping component determines which address is to be used. For example, a database may be queried to determine a user's address for SMS messages. The user's phone number may be returned in response. The contextual identity mapping component utilizes many sources that collect dynamic presence information from the network as well as static mapping databases. For example, messages are received from an HLR (Home Location Register) when a subscriber's cell phone becomes registered on the network. As another example, a SIP registration is received when a user registers into the IMS or Microsoft Live Communication Server environment, or a RADIUS message when the user logs into a corporate network via RADIUS (Remote Authentication Dial-In User Service). This component maintains information about on which channels/domains a user is reachable as well as any addressing/routing information for that domain obtained via presence.

According to one embodiment, in determining the appropriate receiver identity, the receiver's identity is mapped using either a local or external database. Presence information which indicates the type of client/application that the receiver is using is obtained. The message is then formatted to the target UE and the network bridge dynamically maintains the identity mapping relationship between the specific session of the originator and the receiver. The contextual identity database itself contains a mapping of the user routable addresses, associated client characteristics (which can also be determined dynamically), and the user's order/routing preference, if they cannot be located. For example, a user may prefer that if the user is not home, at his or her desk, or on his or her cell phone, that a message is sent via e-mail).

Figure 3:
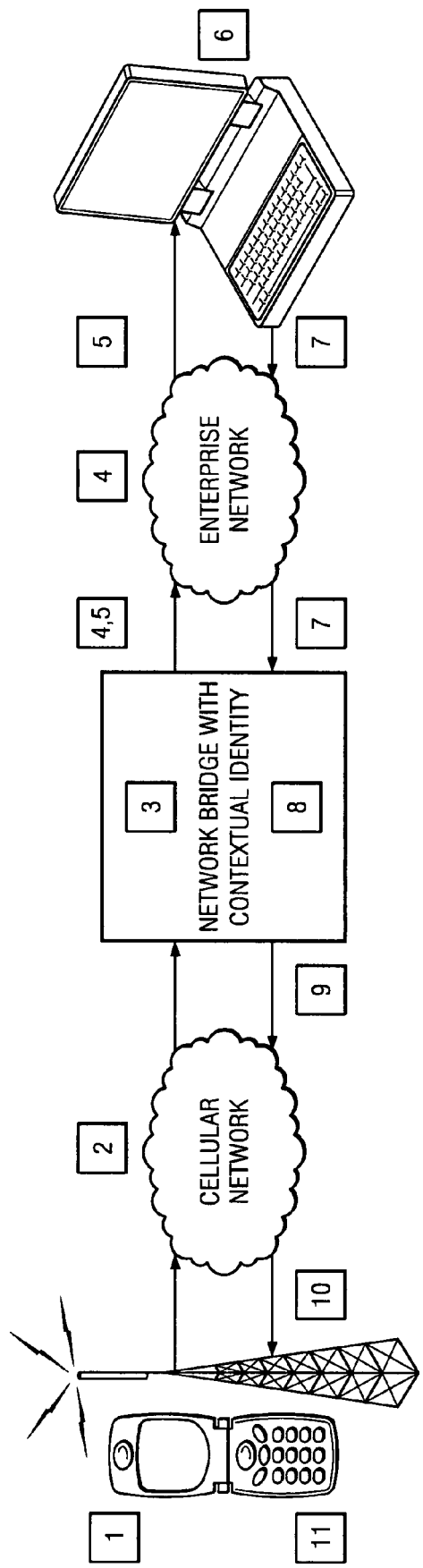
FIG. 3 depicts a block diagram for illustrating an exemplary embodiment of one embodiment of the present invention that provides for contextual-based identity.

Reference is now made to FIG. 3 which depicts a block diagram for illustrating an exemplary embodiment of the present invention that provides for contextual-based identity. Providing for contextual-based identity ensures that the identities or addresses used are valid or desired for the channel being used for delivery of a service. For example, if a message is delivered via SMS or MMS, then both the originator and recipient addresses should be expressed as MSISDNs irrespective of whether the message was originated via a phone, IM, e-mail, or some other application. Providing for contextual-based identity takes into account a number of factors in determining which delivery channel should be used to reach a user. Such factors may include without limitation the media requirements of the service/message, the channels via which the subscriber is currently available, the subscriber's preferences, and how the originating subscriber is classified by the target subscriber (for example, e-mails from a user's family are delivered as MMS messages while the user is away from home).

In the example of FIG. 3, Joe wishes to communicate with Fred. Joe's MSISDN is +441234567890, and Joe's SIP URI (Uniform Resource Identifier) is sip:joe@acme.com. Fred's MSISDN is +440987654321, and Fred's SIP URI is sip:fred@acme.com. Thus, both Joe and Fred have multiple IDs and can be reached via multiple channels. Joe and Fred may be reached at additional addresses, such as E.164 numbers, IP addresses, other e-mail addresses, and various other routable messaging addresses.

Joe wishes to send an SMS message to Fred. Joe's user equipment currently comprises a cellular phone, while Fred's user equipment currently comprises a laptop. Joe, as originator, creates an SMS message, and selects Fred, as recipient, from an address book in Joe's cellular phone. Joe sends the SMS to Fred's MSISDN (+440987654321) via a cellular network. The network bridge looks up an association between Fred and Fred's number (e.g. using Fred's MSISDN). The network bridge, based on presence information which may be associated with Fred such as Fred's user profile, address resolution information or other factors, opens a channel of communication and creates an IM chat session to Fred's IM identity (i.e., SIP URI, sip:fred@acme.com.) Fred receives the chat session invitation on Fred's laptop, and Fred responds according to an appropriate protocol (i.e., accepts the chat session invitation), which appears from Joe's IM identity (i.e., SIP URI, sip:joe@acme.com.) Fred receives a text IM from Joe at sip:joe@acme.com. Thus, the originator, Joe, is able to identify the recipient, Fred, using an address in context to the originating client and not the recipient client. In addition, Joe's identity is presented to Fred in context to the client and application that Fred is currently using.

Next, Fred wishes to send a file to Joe. Fred, as originator, drags a file comprising a JPEG image and drops it onto his IM chat session window. The image is sent as file transfer via IM chat session with sip:joe@acme.com. The network bridge, based on presence information, Joe's user profile, and address resolution information, or other factors, determines to deliver the image to Joe via MMS. A MMS is created and sent to Joe at +441234567890, and is presented to Joe as if sent from +440987654321. The MMS is received by Joe's cellular phone. Joe's cellular phone maps the originator MSISDN to the phone book entry for Fred. Thus, the originator, Fred, is able to identify the recipient, Joe, using an address in context to the originating client and not the recipient client. In addition, Fred's identity is presented to Joe in context to the client and application that Joe is currently using.

An ID can change dynamically, and therefore, tracking presence to track the UE may be provided. For example, Fred may move from his desk (where his laptop is) to his cell phone. By doing so, Fred has dynamically changed his presence (by one of many means such as idle timeout or proximity detection, for example). As a result, his default routing changes dynamically, and the system updates and tracks this change to allow the next message to arrive (in context) on Fred's new device (his cell phone).

Figure 4:
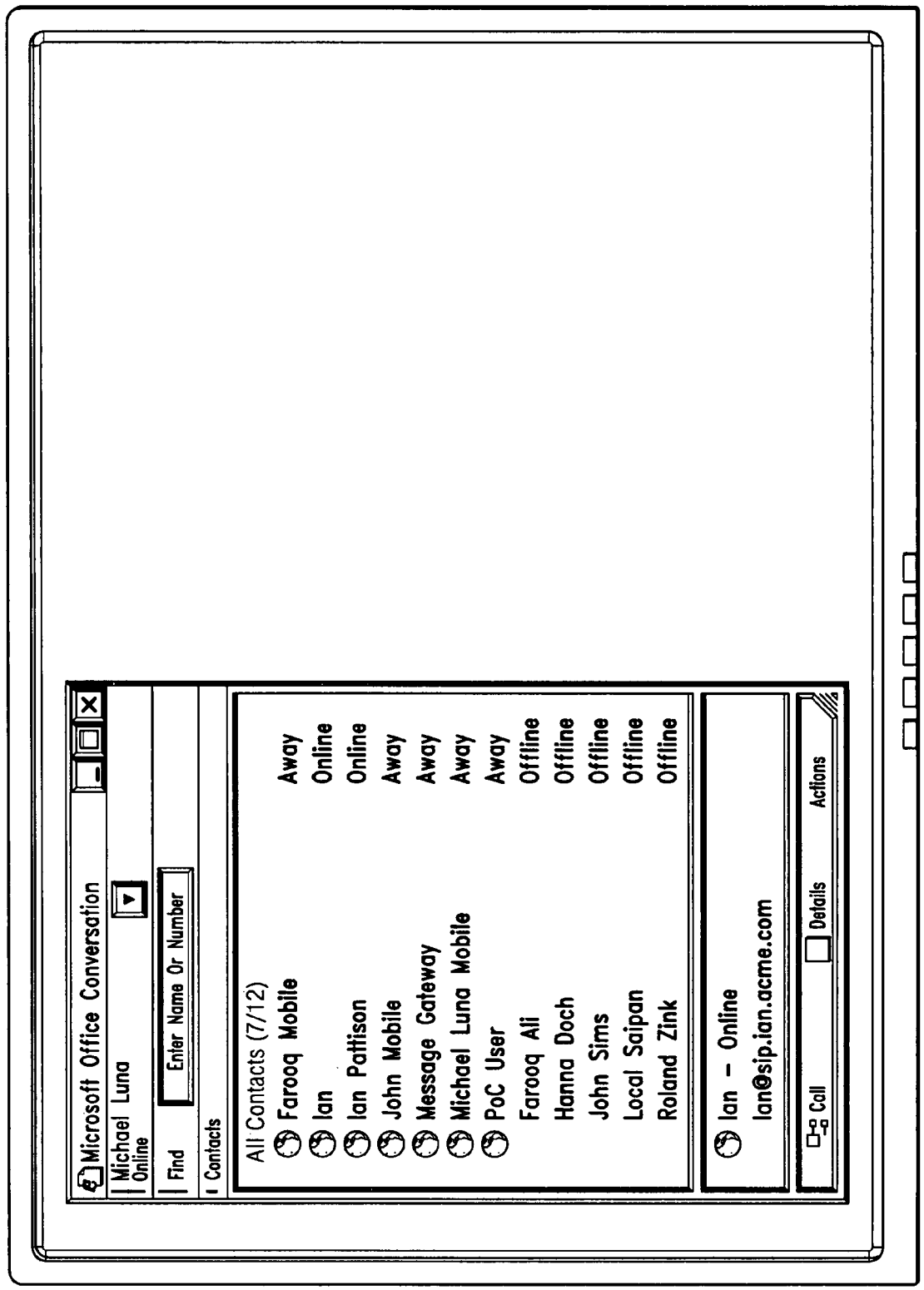
Figure 5:
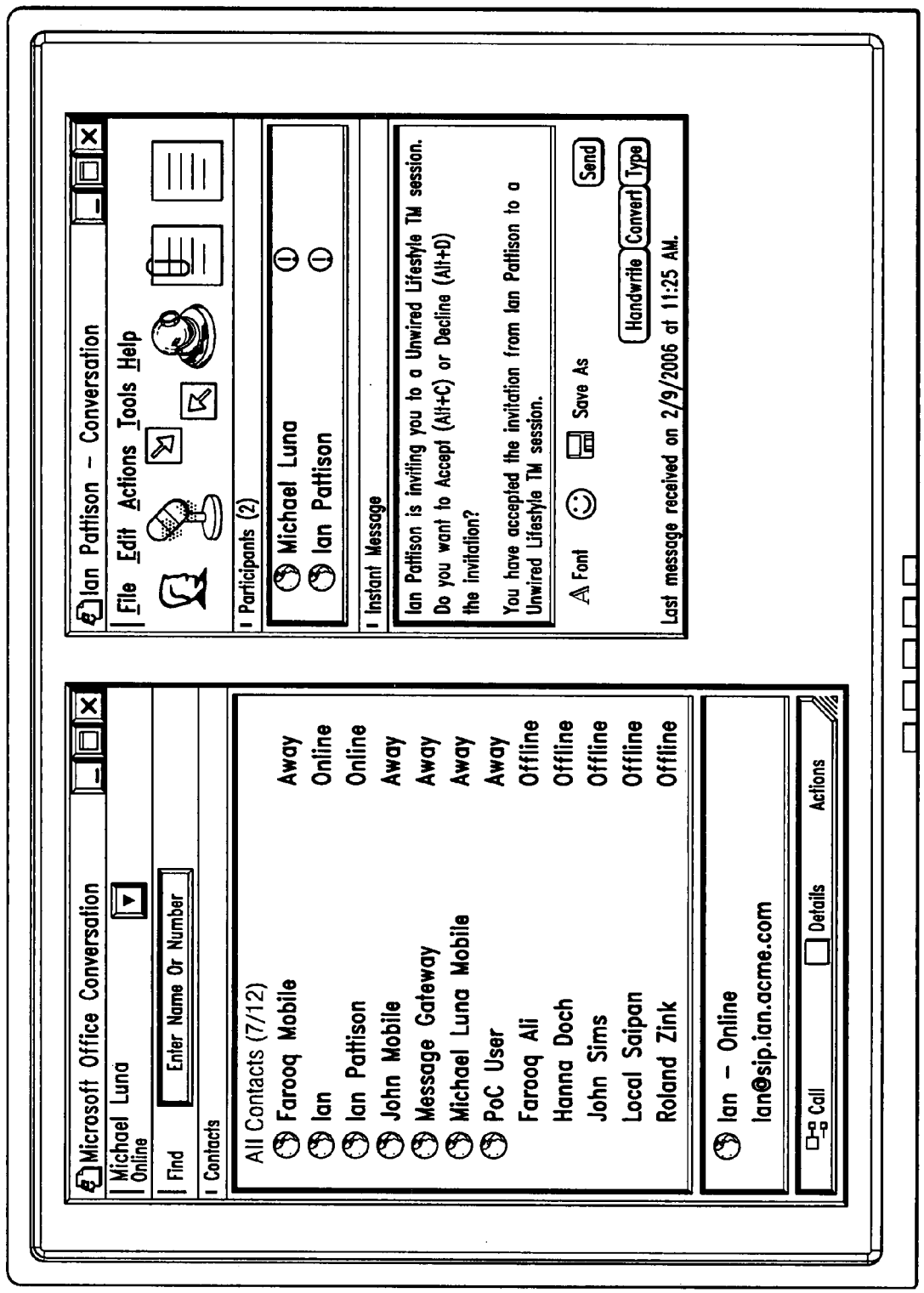
Figure 6:
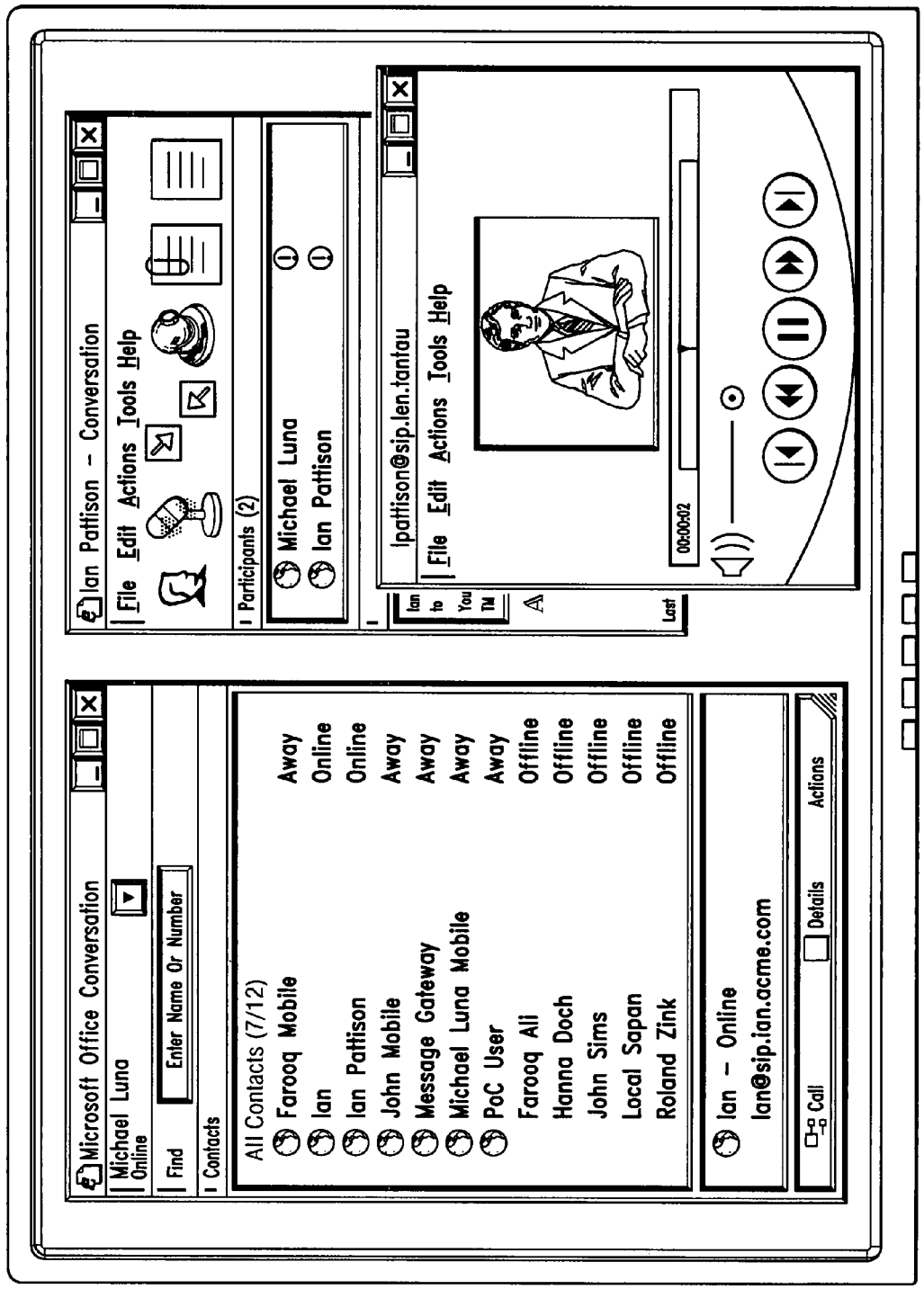

Reference is now made to FIGS. 4, 5, and 6, which depict exemplary user interfaces for providing seamless interoperability between an IM-enabled client, e.g., Microsoft® Office Communicator client, and a PoC-enabled client that is able to send and receive multimedia and video. In this example, a user of a mobile phone (Ian Pattison) wishes to deliver MMS, PoC, and video to the IM user (Michael Luna).

In FIG. 4, one embodiment of a user interface for an IM client is depicted. In FIG. 5, the IM user (Michael) receives an invitation to a conversation, delivered as an instant message from sip:ianp@sip.len.tantau.com. To Michael, the format of the identity it appears as though Ian is communicating in an IM context. Michael is given the opportunity to accept or deny the invitation in a format supported by his device (i.e., pressing the Alt+C keys on a keyboard to Accept or Alt+D to Decline.) In this example Michael accepts the invitation and a notification is provided in a format supported by his device (i.e., the text message "You have accepted the invitation from Ian Pattison to an Unwired Lifestyle™ session.") is presented)

In FIG. 6, a video message from Ian is delivered to Michael, with Ian's identity appearing as sip:ianp@sip.len.tantau, even though the video image shows Ian communicating via a cellular phone with headset and as such would have addressed Michael via his MSISDN and the MMS infrastructure would have set the originating address to Ian's MSISDN.

Figure 8:
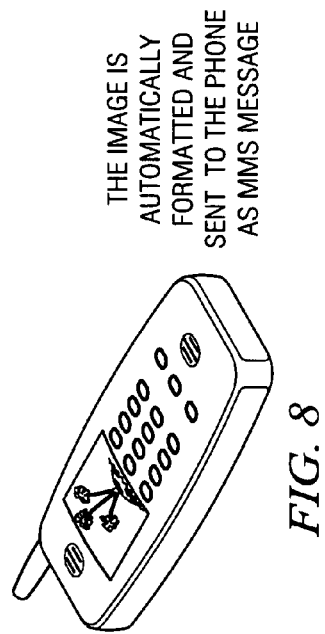
FIGS. 4-8 depict exemplary embodiments of user interfaces for providing seamless interoperability between an instant messaging environment and a mobile environment with devices supporting MMS, SMS and PoC (Push to talk over Cellular)
Figure 7:
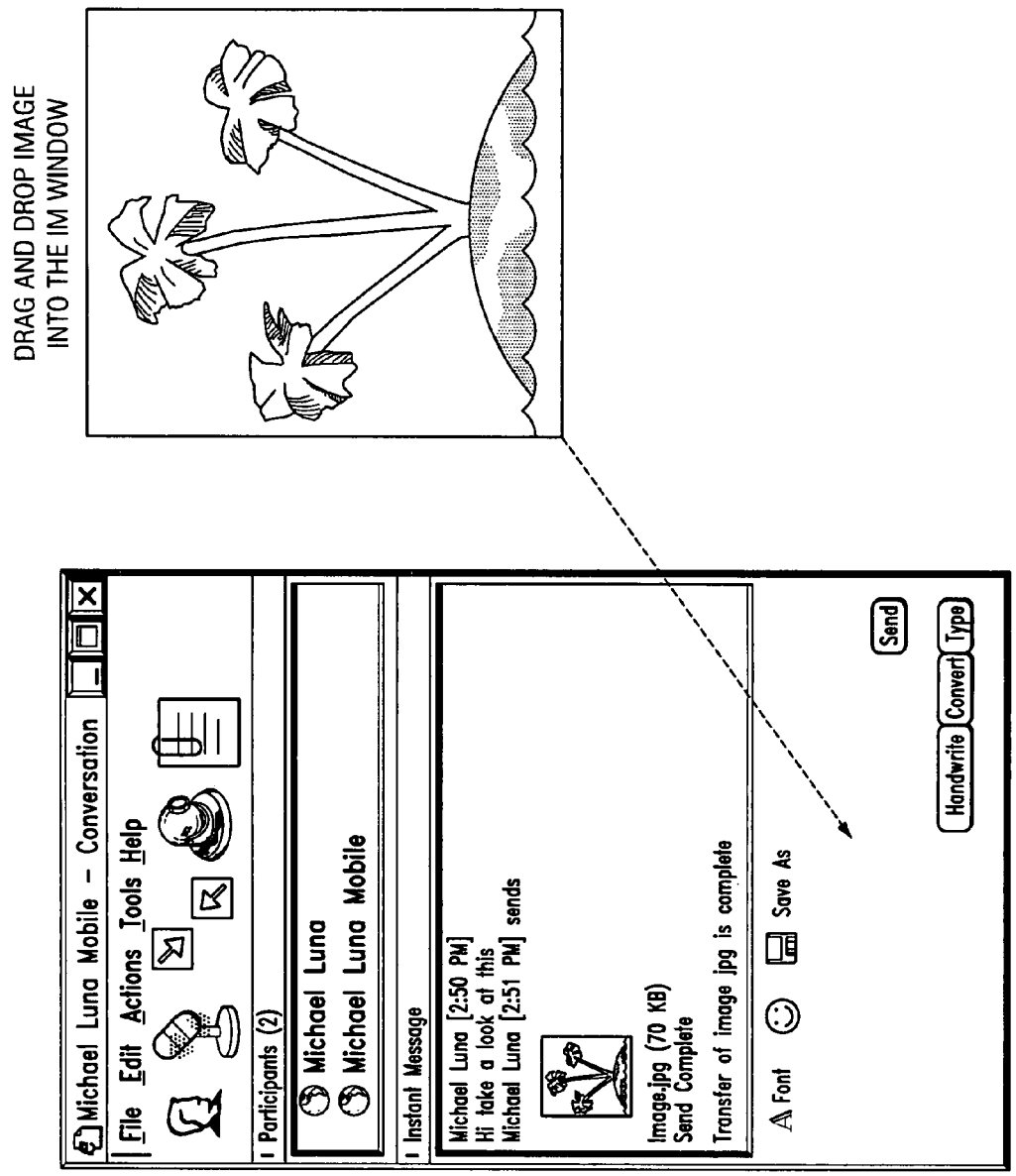

In FIG. 7, Michael wishes to send an image (sunset.jpg) from his computer to the Ian on his cellular phone. Michael drags and drops the image into the IM window. Using the methods and systems of the present invention, the image (sunset.jpg) is formatted and sent to Ian's mobile phone and displayed as an MMS message, as depicted in FIG. 8. Thus, both Ian and Michael are able to send and receive communication from each other, with each person sending and receiving the communication in a format based on the device each is using, and the other person appears as though he is using the same protocol.

Figure 9A:
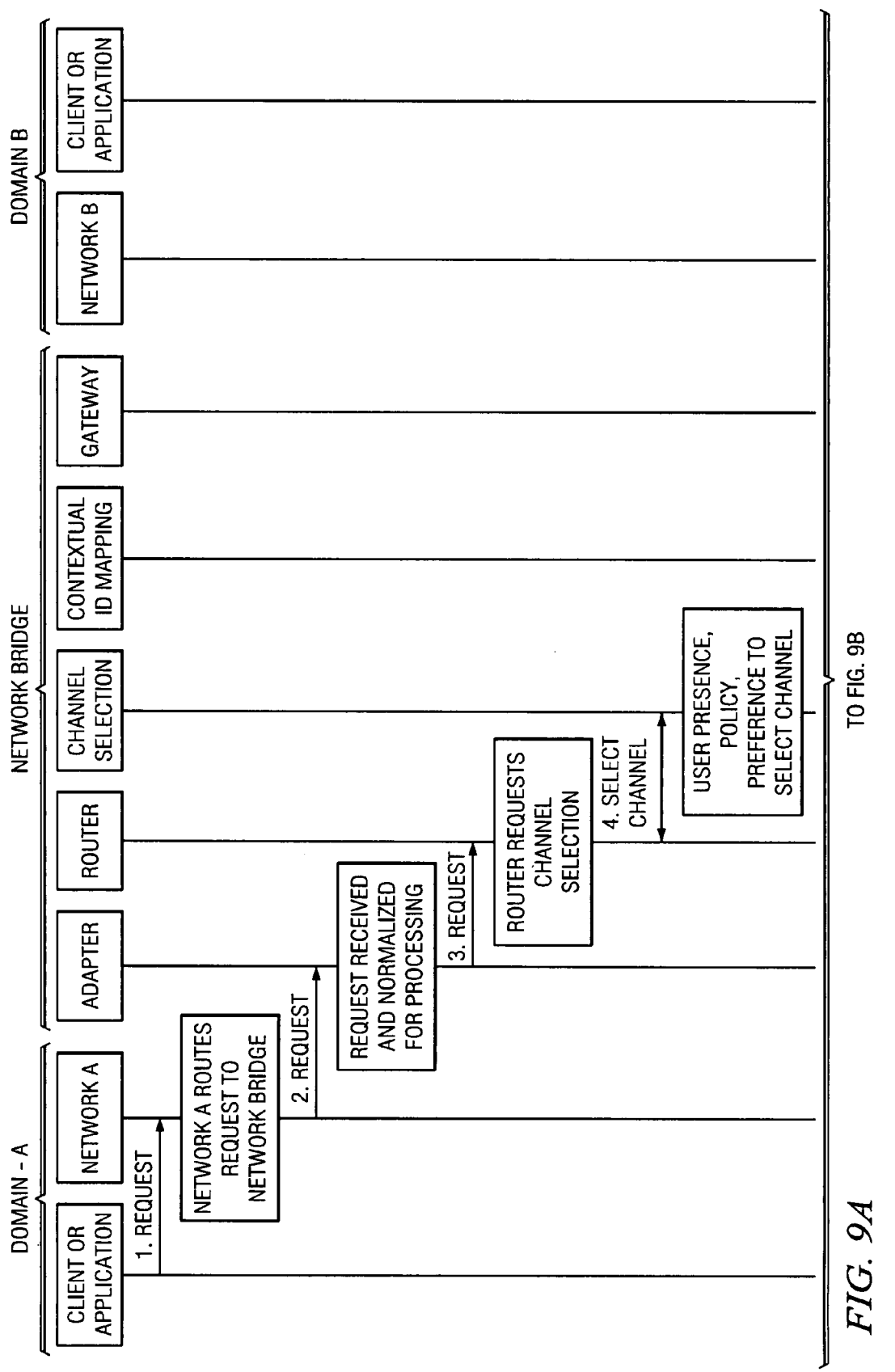
FIGS. 9-10 depict diagrams of one embodiment of contextual based identity processing.
Figure 9B:
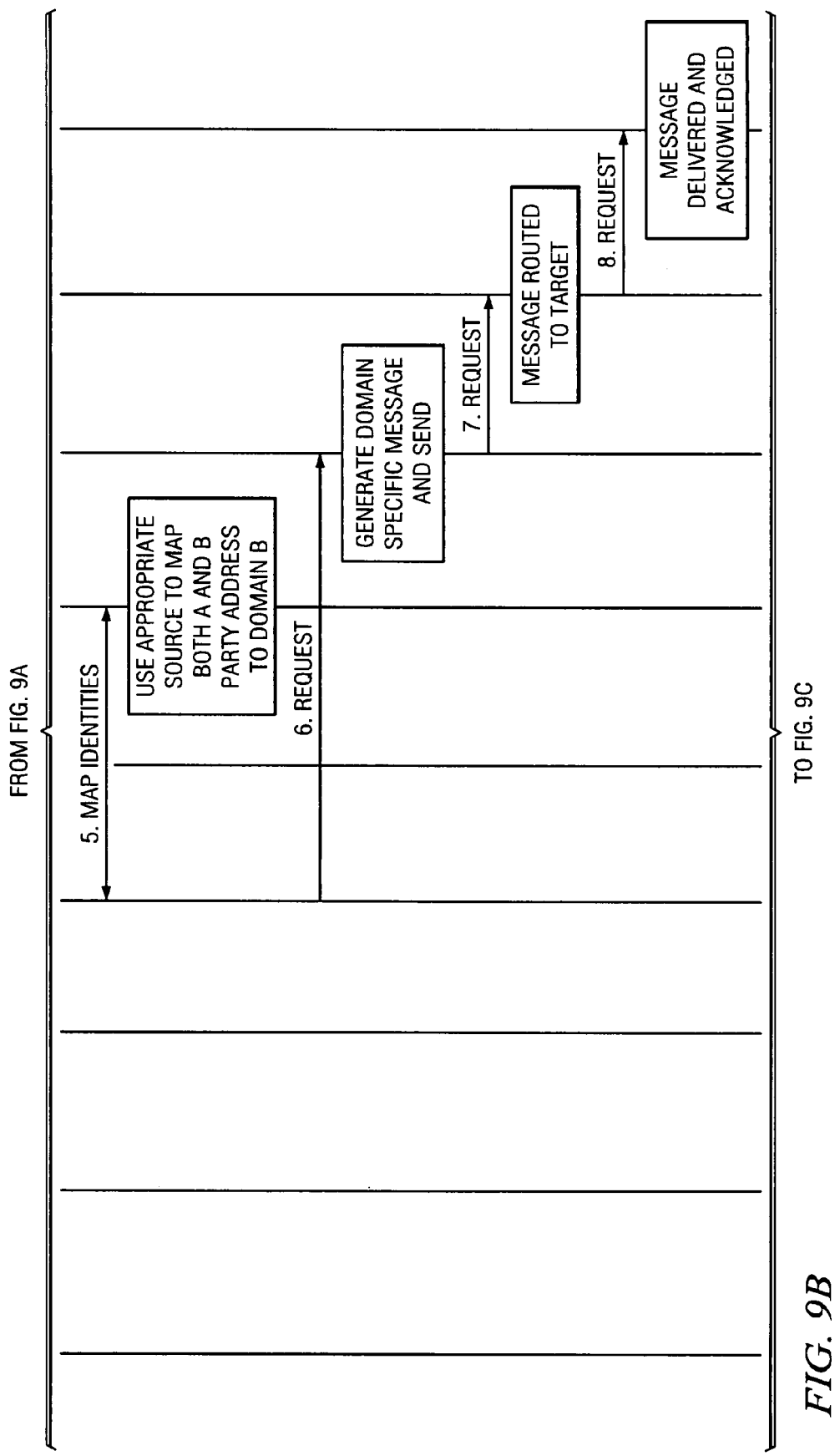
Figure 9C:
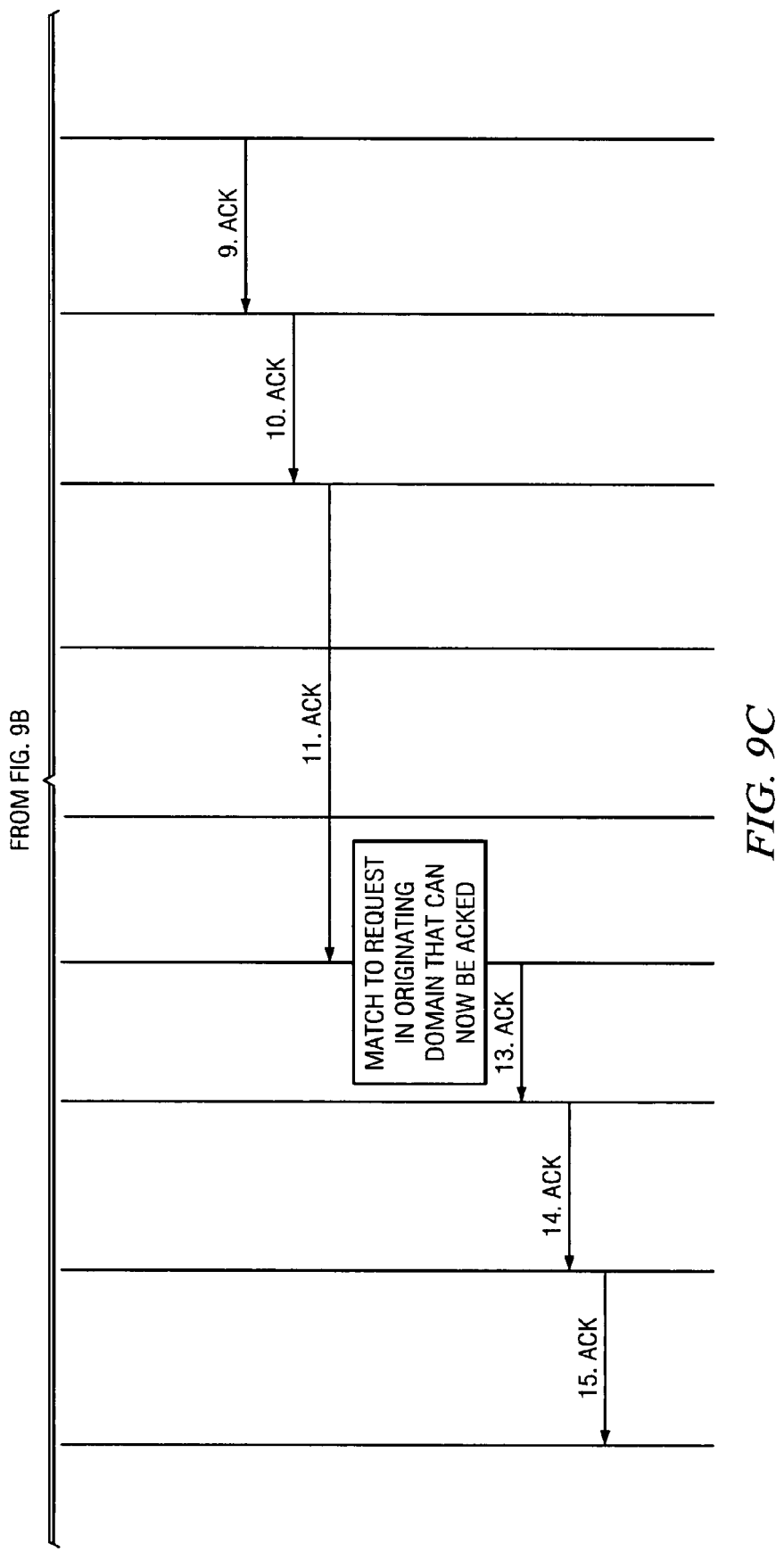
Figure 10A:
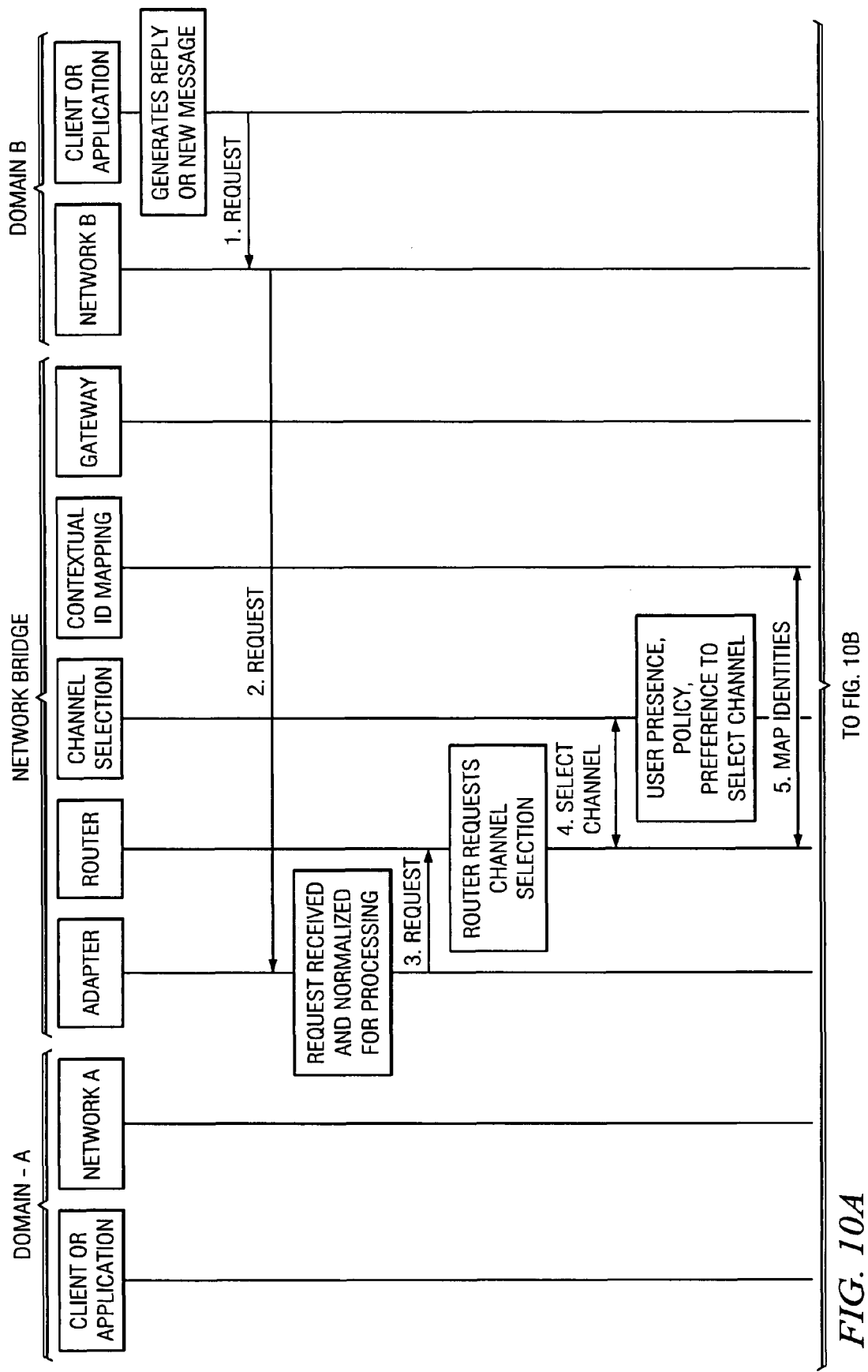
Figure 10B:
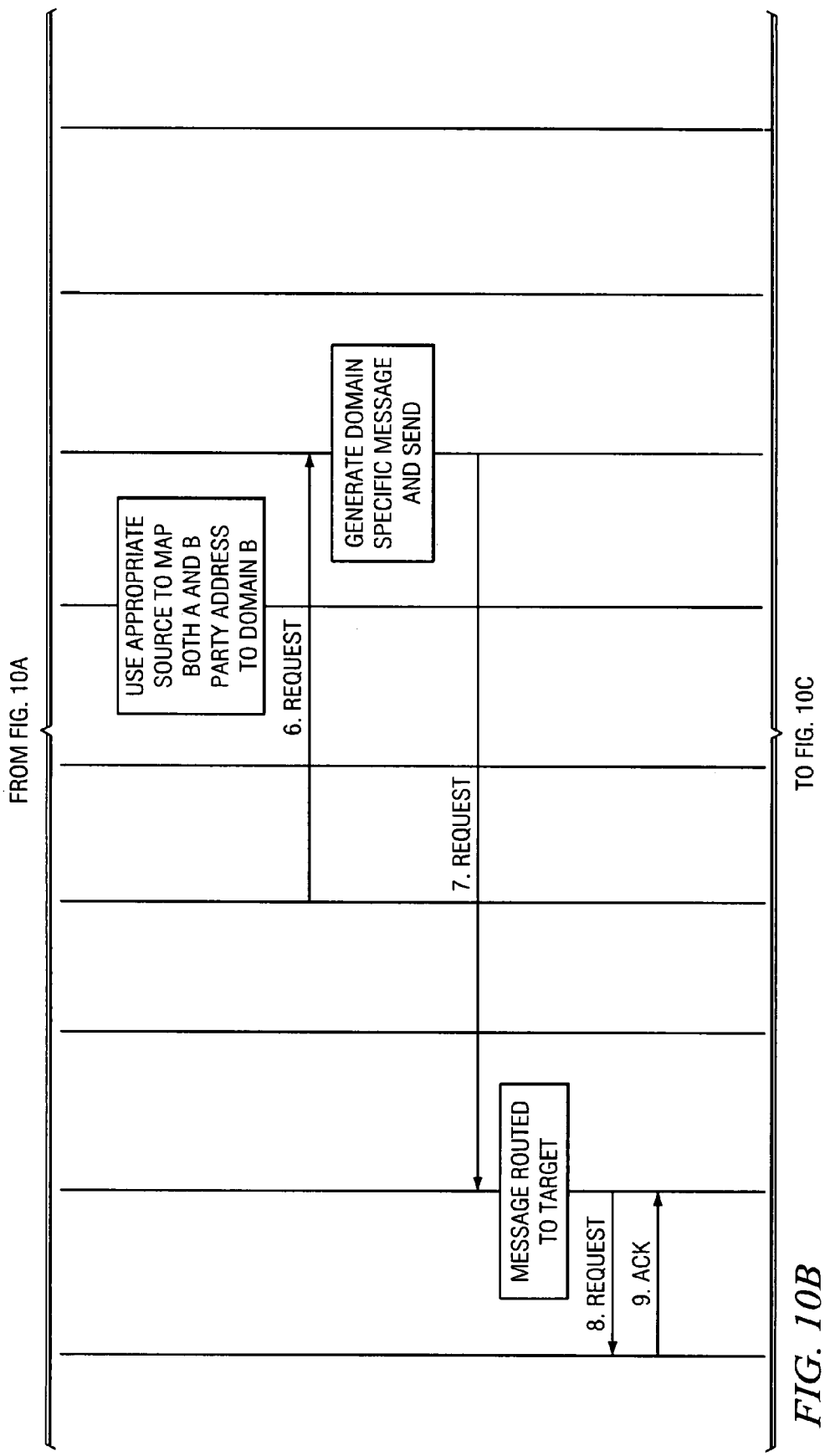
Figure 10C:
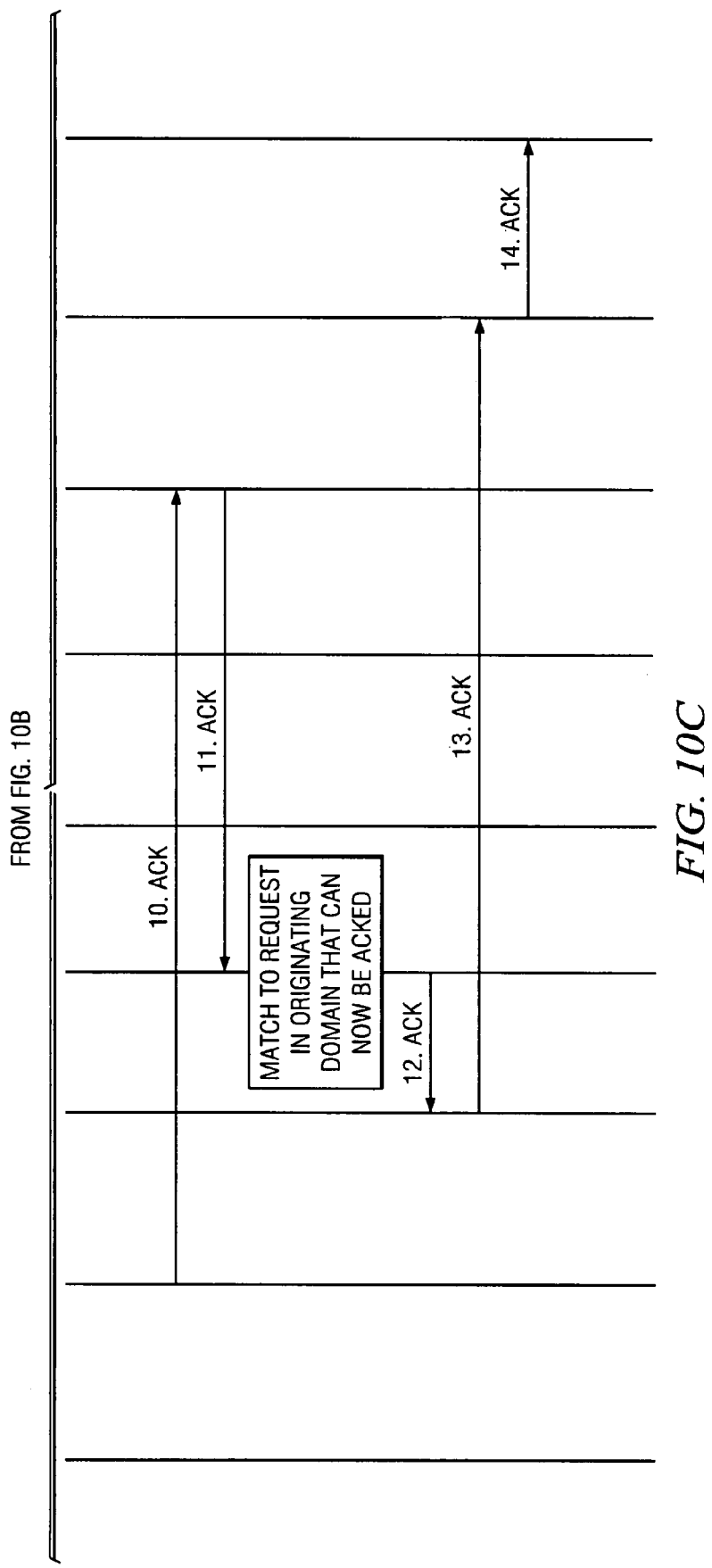

FIGS. 9 and 10 depict flow diagrams for contextual based identity processing. In FIG. 9, initially a client or application in Domain A sends a communication (e.g. request) to Network A. Network A routes the request to a network bridge in accordance with the present invention, including one or more adapters, a router, a channel selection and routing application, or a contextual identity mapping application. The adapters receive and normalize communications into a network-independent format. One method for normalizing the communications is described in U.S. Pat. No. 6,173,327 issued to Jeroen De Borst et al, which is incorporated by reference. Once the communication is normalized, a router sends a request for an appropriate channel for the intended recipient to the channel selection and routing application. The channel selection and routing application may use fixed rules, presence information, user profile information, address resolution information, policies (such as matching the content type of the request to one or more content types supported by a channel through which the recipient may be reached), and preferences to select an appropriate channel. The router also sends a request for an appropriate identity to the contextual identity (ID) mapping application. The contextual identity (ID) mapping application may also use presence information, user profile information, address resolution information, policies, and preferences to map the identities for both the sender and the recipient into addresses valid in the recipient's domain (Domain B).

Once an appropriate channel has been selected and appropriate identities have been mapped, the router sends the communication to a gateway. The gateway generates a domain-specific message (communication) and sends the message to Network B. Network B routes the message to the client/application in a contextual format for the recipient's device. Advantageously, the recipient receives the request in the correct context of the target domain (e.g. Domain B) and therefore can use all normal or desired functions (e.g. reply.)

Once the message is delivered to the recipient, a protocol level acknowledgement may be part of the domain protocol, and so an acknowledgement communication (ACK message) is sent by the original recipient to the original sender. The acknowledgement is sent to a Network B server, which routes it to the gateway of the present invention. The gateway forwards the acknowledgement message to the router, which matches the acknowledgement message to the original communication. The acknowledgement message is returned through the adapter to the Network A server, which routes it to the original sender.

Optionally, in one embodiment, the recipient in Network B may send a communication such as a reply or a new message. In FIG. 10, Client B generates a reply or new message and sends the communication to a server in Network B. Network B routes the communication to an adapter, which may or may not be the same adapter used in the original communication. The communication (reply or new message) is normalized into a network-independent format and sent to a router. The router sends a request for an appropriate channel for the intended recipient to the channel selection and routing application. The channel selection and routing application can select an appropriate channel using any of the methods and processes used to determine the original channel, or may use different processes or methods. The router also sends a request for an appropriate identity to the contextual identity (ID) mapping application.

The contextual identity (ID) mapping application may also use presence information, user profile information, address resolution information, policies, and preferences to map the identities for both the sender and the recipient into addresses valid in the recipient's domain (Domain B). Once an appropriate channel has been selected and appropriate identities have been mapped, the router sends the communication to a gateway. Advantageously, the present invention determines an appropriate channel and identity for each message, which enables users to switch devices without disrupting communication. The gateway generates a domain-specific message (communication) and sends the message to Network A. Network A routes the message to the client/application in a contextual format for the Client A's device. Advantageously, Client A receives the request in the correct context of the target domain (e.g. Domain B) and therefore can use all normal functions (e.g. reply.)

Once the message is delivered to Client A, a protocol level acknowledgement may be part of the domain protocol, and so an acknowledgement communication (ACK message) is sent by Client A to the original sender. The acknowledgement is sent to a Network A server, which routes it to the gateway of the present invention. The gateway forwards the acknowledgement message to the router, which matches the acknowledgement message to the original communication. The acknowledgement message is returned through the adapter to the Network B server, which routes it to Client B.

Thus, the above examples illustrate how users may communicate with each other without needing to know about each other's technology requirements. The senders do not need to be aware of which channel the receivers are using. Furthermore, the senders' client devices and the receivers' client devices need not be unaltered. The senders' software and the receivers' software need not be unaltered. The senders and receivers do not need to subscribe to the same type of network or use the same type of service. Messages and data are presented to the sender in the context of the sender's client, while messages and data are presented to the receiver in the context of the receiver's client. The context can be dynamically updated during a communication session based on a change in the sender's client or the receiver's client.

As a result, users of legacy networks can be seamlessly connected to users of next-generation networks. Hence, barriers to technology are advantageously removed. True roaming and enrichment for IM clients (such as Yahoo, Google Talk, MSN, Office Communicator, AOL's TalkNow, etc.) are enabled. The user experience is improved and the user community is expanded. Features of embodiments of the present invention spur adoption of new technology by extending the reach into legacy networks. Business models for new services can be driven from both the new and existing subscriber base. Usage of services is increased, leading to higher revenues for service providers.

It should be understood that the inventive concepts disclosed herein are capable of many other modifications. To the extent such modifications fall within the scope of the appended claims and their equivalents, they are intended to be covered by this patent. It should also be understood that the term "a" as used herein generally means "one or more" and is not intended to be construed in a singular sense. In addition, the operations described in connection with the methods of the present invention need not necessarily be executed in the sequence described, as they may be executed in a different sequence consistent with the principles of the present invention.

What is claimed is:

1. A method for communicating according to contextual identity, the method comprising the acts of:
   at a network bridge, receiving a communication from an originator via a first network which communicates according to a first communication protocol, wherein the communication has a first identity for the originator based on the first communication protocol and a first identity for a recipient for which the communication is intended, wherein the first identity of the recipient is based on the first communication protocol, wherein each of the first identity of the originator and the first identity of the recipient comprises one of a routable address, an E.164 number, a phone number, an MSISDN, a SIP URI, an IP address, an e-mail address, or an IM identity;
   normalizing the communication into a network-independent format;
   identifying a plurality of devices associated with the recipient, wherein each of the plurality of devices communicates using one or more communication protocols;
   selecting one of the plurality of devices based on one or more criteria, including preferences or presence information associated with the recipient;
   selecting a channel of communication for the selected device based on a recipient preference, presence information associated with the recipient, a classification of the originator by the recipient, a service provider policy, or an attribute of the request, wherein the selected channel of communication is in a second network which communicates according to a second communication protocol different from the first communication protocol;
   determining a second identity for the originator and a second identity of the recipient based on the selected channel of communication; and
   sending the communication to the recipient via the second network according to the second communication protocol, wherein the communication is associated with the second identity for the originator and the second identity of the recipient such that it appears that the originator is communicating with the recipient through the selected channel of communication from the second identity for the originator,
   wherein each of the second identity for the originator and the second identity for the recipient comprises one of a routable address, an E.164 number, a phone number, an MSISDN, a SIP URI, an IP address, an e-mail address, or an IM identity; and
   selecting a third identity for the originator or the recipient corresponding to a third network that communicates according to a third communication protocol that is different from the first communication protocol and the second communication protocol, wherein the selection of the third network is based on dynamic presence information associated with the originator or the recipient.

2. The method of claim 1, wherein the communication includes an image, wherein the image is formatted according to the recipient.

3. The method of claim 1, wherein the second communication protocol includes a protocol level acknowledgement, wherein the method further comprises:
   receiving an acknowledgement message from the recipient;
   matching the acknowledgement message to the original communication; and
   routing the acknowledgement message to the originator, wherein the acknowledgement message includes the first identity for the originator and the first identity for the recipient.

4. The method of claim 1, wherein the communication from the originator comprises a push-to-talk service request, an instant messaging service request, an MMS message and an SMS message.

5. The method of claim 1, wherein the second network comprises a macro-cellular network or an IP-based network.

6. The method of claim 1, further comprising the acts of:
   routing the normalized communication to an application server operable to generate a response to the communication; and
   receiving a communication from the application server, wherein the communication received from the application server is sent to the recipient.

7. A method for service delivery according to contextual identity, the method comprising the acts of:
   at a network bridge, receiving a service request from an originator via a first network, wherein the first network communicates using a first communication protocol, wherein the service request includes a first identity of the originator and a first identity of an intended recipient based on the first communication protocol, wherein the first identity comprises one of a routable address, an E.164 number, a phone number, an MSISDN, a SIP URI, an IP address, an e-mail address, or an IM identity, wherein the first identity for the recipient comprises one of a routable address, an E.164 number, a phone number, an MSISDN, a SIP URI, an IP address, an e-mail address, or an IM identity;

normalizing the service request into a network-independent format;

identifying a plurality of devices associated with the recipient, wherein each of the plurality of devices communicates using one or more communication protocols;

selecting one of the plurality of devices based on one or more criteria, including preferences or presence information associated with the recipient;

selecting a channel of communication for the recipient using a second network which communicates using a second communication protocol that is different from the first communication protocol based on a recipient preference, presence information associated with the recipient, a classification of the originator by the recipient, a service provider policy, or an attribute of the request;

selecting a second identity for the originator and a second identity of the recipient based on the selected channel of communication; and sending the service request to the second user via the second network according to the second communication protocol, wherein the service request includes a second identity of the originator and a second identity of the intended recipient based on the second communication protocol such that it appears that the originator is communicating with the recipient through the selected channel of communication from the second identity for the originator, wherein the second identity for the originator comprises one of a routable address, an E.164 number, a phone number, an MSISDN, a SIP URI, an IP address, an e-mail address, or an IM identity, wherein the second identity for the recipient comprises one of a routable address, an E.164 number, a phone number, an MSISDN, a SIP URI, an IP address, an e-mail address, or an IM identity; and selecting a third identity for the originator or the recipient corresponding to a third network that communicates according to a third communication protocol that is different from the first communication protocol and the second communication protocol, wherein the selection of the third network is based on dynamic presence information associated with the originator or the recipient.

8. The method of claim 7, wherein the communication includes an image, wherein the image is formatted according to the recipient.

9. The method of claim 7, wherein the second communication protocol includes a protocol level acknowledgement, wherein the method further comprises:

receiving an acknowledgement message from the recipient;

matching the acknowledgement message to the original communication; and routing the acknowledgement message to the originator, wherein the acknowledgement message includes the first identity for the originator and the first identity for the recipient.

10. The method of claim 7, further comprising the step of selecting a third network based on dynamic presence information associated with the recipient.

11. The method of claim 7, wherein the service request comprises a push-to-talk service request, an instant messaging service request, an MMS message and an SMS message.

12. The method of claim 7, further comprising the steps of:

receiving a response from the recipient, wherein the response includes originator and recipient identities based on the second communication protocol;

normalizing the response; and sending the response to the originator, wherein the response received by the recipient includes originator and recipient identities based on the first communication protocol.

13. The method of claim 12, wherein the response comprises an SMS message.

14. The method of claim 12, wherein the response comprises a file transfer.

15. The method of claim 7, wherein one of the first and second networks is an IMS network or macro-cellular network, and wherein the other of the first and second networks is an IP-based network or macro-cellular network.

16. The method of claim 15, further comprising the step of receiving a message from the IMS network.

17. The method of claim 15, further comprising the step of receiving a message from the IP-based network.

18. The method of claim 17, further comprising the step of adapting the message for the IMS network.

19. The method of claim 18, further comprising the step of routing the adapted message to the application server.

20. The method of claim 19, further comprising the step of receiving a second response from the application server.

21. The method of claim 20, further comprising the step of sending the second response to the IMS network.

22. A network bridge comprising:

a processor; and a machine-readable non-transitory medium having stored thereon a plurality of executable instructions, the plurality of executable instructions are executable by the processor to perform:

receiving a request from an originator via a first network which communicates according to a first communication protocol, wherein the request includes a first identity of the originator and a first identity of an intended recipient based on the first communication protocol, wherein each of the first identity of the originator and the first identity for the recipient comprises one of a routable address, an E.164 number, a phone number, an MSISDN, a SIP URI, an IP address, an e-mail address, or an IM identity;

identifying a plurality of devices associated with the recipient, wherein each of the plurality of devices communicates using one or more communication protocols;

selecting one of the plurality of devices based on one or more criteria, including preferences or presence information associated with the recipient;

selecting a second identity, from a first associated plurality of identities, of the intended recipient on a second network which communicates according to a second communication protocol that is different from the first communication protocol, wherein the second identity for the intended recipient is selected based on one or more criteria, including preferences or presence information associated with the intended recipient;

selecting a second identity, from a second associated plurality of identities, of the originator on the second network, wherein each of the second identity of the originator and the second identity of the recipient comprises one of a routable address, an E.164 number, a phone number, an MSISDN, a SIP URI, an IP address, an e-mail address, or an IM identity;

adapting the request for the second communication protocol, wherein the adapted request includes the second identity of the originator and the second identity of the recipient such that it appears that the originator is communicating with the recipient on the second network from the second identity for the originator; routing the adapted request to an application server;

receiving a response from the application server; and sending the response to the originator via the first network using the first identity for the originator and the first identity for the recipient such that it appears that the recipient is responding to the originator on the first network using the first identity for the recipient.

\* \* \* \* \*